United States Patent
Nicholas et al.

(10) Patent No.: US 11,247,165 B2
(45) Date of Patent: Feb. 15, 2022

(54) MATERIAL PHASE BETWEEN CONDUCTIVE LAYERS

(71) Applicant: ABB Schweiz AG, Baden (CH)

(72) Inventors: Nolan W. Nicholas, Granby, CT (US); Thomas Morgan, Stow, MA (US)

(73) Assignee: ABB Schweiz AG, Baden (CH)

( * ) Notice: Subject to any disclaimer, the term of this patent is extended or adjusted under 35 U.S.C. 154(b) by 637 days.

(21) Appl. No.: 16/033,703

(22) Filed: Jul. 12, 2018

(65) Prior Publication Data

US 2020/0016526 A1    Jan. 16, 2020

(51) Int. Cl.
*B01D 53/02* (2006.01)
*B01D 15/38* (2006.01)

(52) U.S. Cl.
CPC ....... *B01D 53/025* (2013.01); *B01D 15/3885* (2013.01)

(58) Field of Classification Search
CPC .......................... B01D 15/3885; B01D 53/025
See application file for complete search history.

(56) References Cited

U.S. PATENT DOCUMENTS

| | | |
|---|---|---|
| 4,603,372 A | 7/1986 | Abadie et al. |
| 6,004,442 A | 12/1999 | Choulga et al. |
| 6,277,489 B1 | 8/2001 | Abbott et al. |
| 7,194,890 B2 | 3/2007 | Tanaka et al. |
| 7,422,724 B1 | 9/2008 | Manginelli et al. |
| 7,541,003 B2 | 6/2009 | Pohl et al. |
| 7,579,077 B2 | 8/2009 | Dubrow et al. |
| 7,608,818 B2 | 10/2009 | Miller et al. |
| 8,736,287 B2 | 5/2014 | Dhirani et al. |
| 8,920,971 B2 | 12/2014 | Strömme et al. |
| 8,962,513 B2 | 2/2015 | Liu et al. |
| 9,128,015 B2 | 9/2015 | Holmes et al. |
| 9,194,848 B2 | 11/2015 | DeMarco |
| 9,240,556 B2 | 1/2016 | Marks et al. |
| 9,664,702 B2 | 5/2017 | Holmes et al. |
| 9,696,285 B2 | 7/2017 | Duraffourg et al. |
| 9,802,827 B2 | 10/2017 | Showalter |
| 9,945,878 B1 | 4/2018 | Gordon et al. |
| 9,952,240 B2 | 4/2018 | Holmes et al. |
| 2005/0227373 A1 | 10/2005 | Flandre et al. |

(Continued)

FOREIGN PATENT DOCUMENTS

WO    2008000045 A1    1/2008

OTHER PUBLICATIONS

International Search Authority—U.S. International Search Report & Written Opinion issued in corresponding Application No. PCT/US2019/041019, dated Oct. 9, 2019, 9 pp.

*Primary Examiner* — Christopher P Jones
(74) *Attorney, Agent, or Firm* — Leydig, Voit & Mayer, Ltd.

(57) ABSTRACT

A chromatograph is provided for identifying components of a mixture. Components are identified by different rates of adsorption and/or desorption with a material phase. In one embodiment, an electrical lead is connected to the material phase for supplying an electrical charge to the material phase. The electrical charge alters the rate of adsorption/desorption of the components with the material phase. In another embodiment, the material phase is disposed between two conductors with electrical leads connected to each of the conductors. A charge differential between the two conductors alters the rate of adsorption and/or desorption of components with the material phase.

20 Claims, 4 Drawing Sheets

(56) References Cited

U.S. PATENT DOCUMENTS

| | | |
|---|---|---|
| 2009/0176915 A1 | 7/2009 | Yan et al. |
| 2009/0273354 A1 | 11/2009 | Dhirani et al. |
| 2014/0234949 A1 | 8/2014 | Wasson et al. |
| 2016/0361677 A1 | 12/2016 | Blackley |
| 2016/0363570 A1 | 12/2016 | Blackley |
| 2016/0363572 A1 | 12/2016 | Blackley |
| 2017/0113951 A1 | 4/2017 | Su et al. |

MATERIAL PHASE BETWEEN CONDUCTIVE LAYERS

BACKGROUND

The present inventions relate generally to identification or separation of mixture components, and more particularly, to the arrangement and use of a material phase in a chromatograph, molecular separation device, or other such system.

Chromatography is a known method for separating components in a mixture. The mixture, which may be a gas or liquid, is known as the mobile phase. The mobile phase is a mixture with multiple components mixed together. The stationary phase is a material that adsorbs and/or desorbs some or all of the components with different strengths of adhesion leading to different rates in adsorption and desorption for each component. While the term "stationary phase" is commonly used in the field of chromatography, such material may also be referred to as a sorptive phase in some fields, and may be referred to more generally as a material phase, which can be considered to be interchangeable for stationary and sorptive phases. It is understood that adsorption/desorption can include a component being adsorbed on or dissolved in the stationary phase or a component being absorbed by the stationary phase. While the term "adsorption" is used herein throughout, it is noted that adsorption may also be understood herein to include absorption. The adsorption/desorption rates are generally dependent upon the environmental conditions applied (e.g. temperature, carrier phase, etc.). In use, the stationary phase is typically enclosed in a long narrow channel typically referred to as a "column," and the mobile phase enters the column at one end and exits the column at the other end. By measuring the quantity and timing of the liquid or gas as it exits the column, the components in the mixture can be identified due to the differences in time that each component requires to pass through the column, which is a direct function of the different adsorption/desorption rates.

The inventions described below relate to a material phase that may be used to improve the operational performance of chromatography and other similar devices and/or simplify or improve monitoring of adsorption/desorption in such devices.

SUMMARY

A material phase and arrangement thereof is described for use in chromatography and other devices. In one embodiment, an electrical lead is connected to the material phase for supplying an electrical charge to the material phase. The charge alters the rates of adsorption and/or desorption of components in the sample mixture. In another embodiment, the material phase is disposed between two conductors. The charge differential between the two conductors alters the rates of adsorption and/or desorption of components in the sample mixture. Modulating the charge supplied to the material phase or a conductor in a capacitive arrangement allows the rates of adsorption and/or desorption to be modulated.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
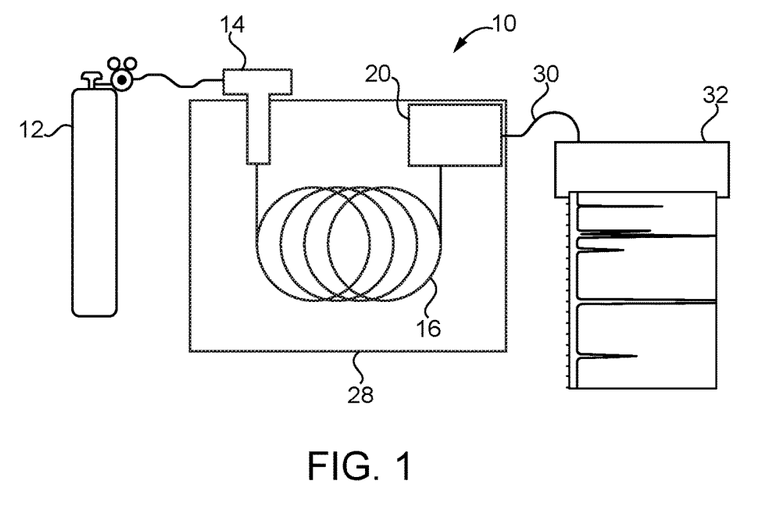
FIG. 1 is a schematic view of a chromatograph.
Figure 2:
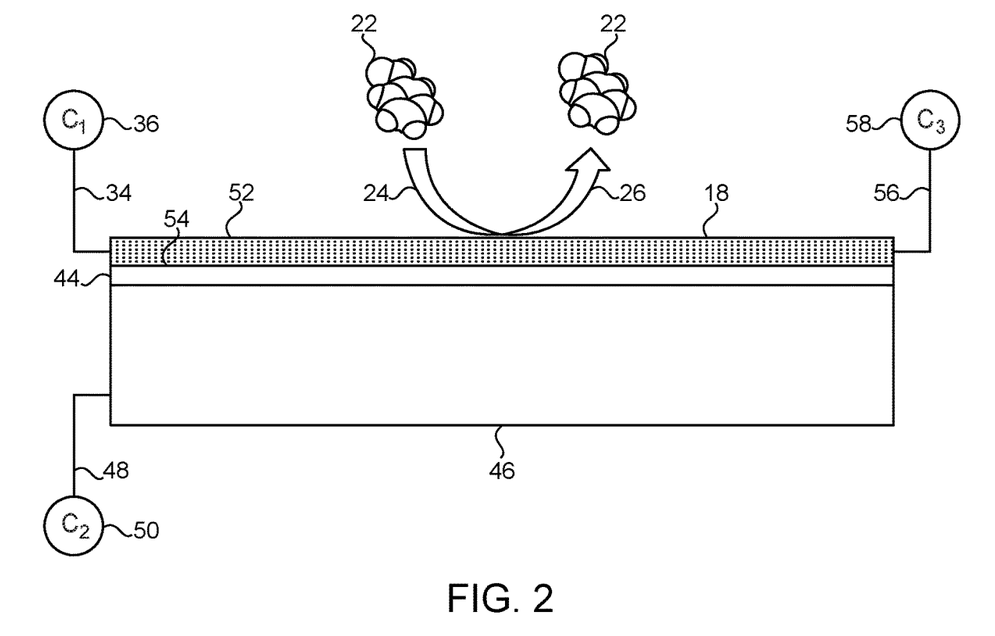
FIG. 2 is a cross-section of a stationary phase arrangement.

Referring now to the figures, and particularly FIG. 1, an example of a chromatograph 10 is shown. The chromatograph 10 is supplied with a mixture made up of multiple components that are intended to be individually identified. In the particular example of FIG. 1, the chromatograph 10 is a gas chromatograph 10 and is supplied with a gas mixture from a tank 12. The gas is supplied to an injector 14 which injects the gas into a stationary phase column 16. Although the stationary phase column 16 may be configured in a variety of ways, and need not necessarily be a column, the stationary phase column 16 contains a stationary phase material 18, or material phase 18, (shown in FIG. 2) that absorbs and desorbs different components of the mixture at different rates, which generally depends upon the applied operational conditions. Conventionally, the column 16 may be a metal tube 16 with the inner surface of the tube coated with the stationary phase material 18. At the opposing end of the column 16, a detector 20 is provided for measuring the time and quantity of gas exiting the column 16. Thus, as the gas mixture passes from the injector 14 to the detector 20, the components of the mixture are absorbed and desorbed by the stationary phase 18. An illustration of a molecule 22 being absorbed 24 and desorbed 26 by the stationary phase material 18 is shown in FIG. 2. Because some components of the mixture are absorbed 24 more strongly and desorbed 26 more slowly, certain components are slower to traverse the column 16 compared to components which are adsorbed more weakly and desorbed more quickly. Thus, components with weaker adsorption/faster desorption will travel through the column 16 faster and will exit the column 16 before the components with stronger adsorption/slower desorption rates. By detecting the timing characteristics of gas exiting the column 16, the detector 20 can identify what types and amounts of components are in the mixture. Preferably, the stationary phase column 16 is located within an oven 28, which provides controlled heating to accelerate/modulate the adsorption/desorption process. In FIG. 1, the data output 30 of the chromatograph 10 is supplied to a recorder 32 which prints out data that may be used to identify the components of the mixture. Alternatively, the data output 30 could be provided to a display screen, a process controller, or a computerized recording device. Although the mobile phase is generally described herein as a gas mixture, it is understood that it may also be possible for the mobile phase to be a liquid mixture.

As shown in FIG. 2, a first electrical lead 34 may be connected to the stationary phase 18. A first charge 36 may be supplied to the stationary phase 18 with the electrical lead 34 in order to alter the rates of adsorption and/or desorption of the components in the mixture by the stationary phase 18.

The stationary phase 18 is preferably constructed such that the application of a charge will alter the adsorption/desorption dynamics of the stationary phase by altering the occupation level of states by quanta within the material which contribute to adsorption/desorption of molecular species. Preferably, the stationary phase 18 possesses a limited electronic density of states around the Fermi level. The stationary phase 18 also possesses an accessible surface area for component adsorption, which in some cases, such as polymeric materials, the surface area may be distributed throughout a bulk phase. Further, the application of a charge to the stationary phase 18 leads to significantly altered populations of the electronic states adjacent to the surface area at which components are adsorbed in such a way that the adsorption/desorption rates are altered.

Preferably, the material of the stationary phase 18 has a limited electronic density of states around the Fermi level. Examples of materials with a limited electronic density of states include graphene (e.g., monolayer graphene), functionalized graphene (e.g., graphene oxides and graphanes), carbon nanotubes, MXenes, surface functionalized nanotubes, molybdenum disulfide, conducting polymer films (e.g., polythiophene, polyaniline, polypyrrole, polyphenylene vinylene, polyphenylene sulfide, polyethylenedioxythiophene, copolymers thereof, and polymer mixtures containing such species), semiconductors (e.g. silicon, zinc oxide, silicon carbide, lead sulfide, $C_{60}$, $Alq_3$), semi-metals, and semiconducting metal-organic-frameworks. In some cases, additional components such as ferroelectric species (such as polyvinylidene fluoride) may be included in the stationary phase which will undergo electrostriction to provide additional contributions to modifying the adsorption/desorption rate of the stationary phase. As described above, these materials will typically be constructed to have a high available surface area for binding of components and may include structures, such as bulk-like films of materials which can adsorb species into the bulk phase (e.g., polymers) and other high surface area structures of materials, such as aerogels of nanotubes, graphenes, semiconductor particles, etc., and vertically aligned arrays of nanotube and nanowire materials (e.g. vertically aligned carbon nanotube arrays).

Figure 3:
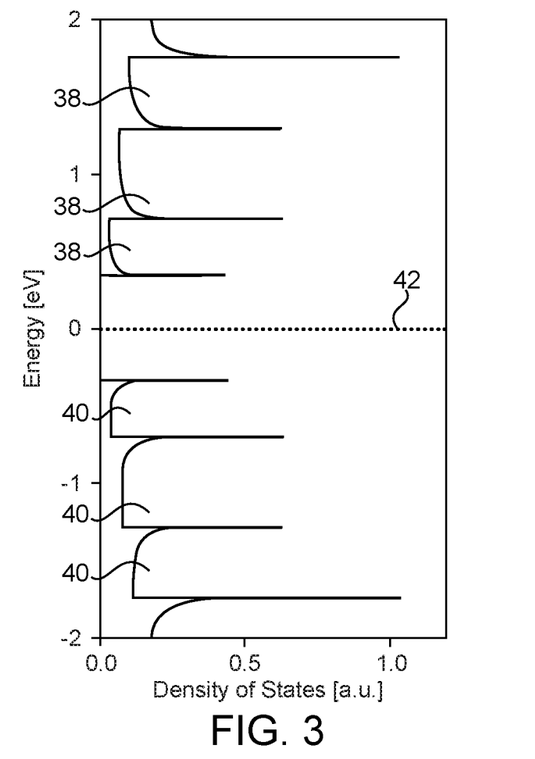
FIG. 3 is a chart showing energy bands of the stationary phase material.

Preferable materials for the stationary phase 18 are semiconductors and semi-metals which possess a limited but non-zero density of states near the Fermi level. Non-traditional "metallic" materials, such as armchair type carbon nanotubes may also be used. By contrast, materials that have a high density of states, which is typical of bulk metals, are less desirable for the invention herein. Insulating materials that do not enable significant tuning of the occupation of electronic states via the application of an electric potential are also less desirable in the invention. An example of the conduction bands 38 and valence bands 40 with respect to the Fermi level 42 for a material with a limited electronic density of states is shown in FIG. 3. It is noteworthy that alterations to the occupation of electronic states in these materials can in some cases alter the phononic states in said materials which can additionally contribute to altering the adsorption/desorption dynamics of species to these materials.

Because the stationary phase material 18 has a limited electronic density of states, the rates of adsorption/desorption of mixture components can be modulated by supplying an electrical charge to the stationary phase material 18 and modulating the charge. Modulation of the charge and rates of adsorption/desorption can occur during chromatography of a single sample test to improve precision of the output by improving the peak shape and peak separation relating to the detections of various components. It should be understood that the stationary phase 18 may be used in the primary testing unit of a chromatograph 10 or can also be used in a pre-concentration unit of a chromatograph 10 if desired. Alternatively, modulation may be used between different tests on a single sample to reconfigure the stationary phase 18 for particular tests. Alternatively, modulation may be used between different samples to reconfigure the stationary phase 18 for particular tests. Modulation may also be used in performance testing and/or calibration of the chromatograph 10. For example, a known mixture may be tested in the chromatograph 10 with the stationary phase 18 modulated to match the expected component identification. The performance of the stationary phase 18 may also be evaluated with a known mixture sample.

A charge may be supplied to the stationary phase 18 in several ways. For example, in FIG. 2 the stationary phase 18 is shown in a capacitive gate arrangement. As shown, an insulating layer 44 and a conductor 46 may also be provided, with the insulating layer 44 separating the stationary phase 18 and conductor 46. Preferable materials for the insulating layer 44 allow the use of high charge differentials across the insulating layer 44, such as ceramic insulators. A second lead 48 may then be connected to the conductor 46. By supplying a first charge 36 through the first lead 34 of the stationary phase 18 and supplying a different second charge 50 through the second lead 48 of the conductor 46, a capacitive charge is applied to the stationary phase 18. In one embodiment, the first and second charges 36, 50 define a DC voltage therebetween. As described above, a sequential series of DC voltages may be used to modulate the adsorption/desorption rate of components 22 on the stationary phase 18 over time. Thus, the electrical charge applied to the stationary phase 18 alters the rates of adsorption and/or desorption of mixture components 22.

Preferably, the thickness of the stationary phase 18 is selected to ensure that the application of a potential to the stationary phase acts to create a desired electronic state occupation level in the vicinity of the adsorption sites to ensure sufficient control over modulation of the adsorption/desorption rates. The filling of the electronic states in the vicinity of the adsorption sites is a function of the penetration of the generated electric field at the location where the various particular adsorption sites reside. The electric field produced by a biasing charge distribution is screened by the resultant population of charged states adopted by the system as is well understood in the art. The depth of penetration of the field is related to a scale called the Debye length. Typically, the thickness of the stationary phase will be less than 4 Debye lengths, and preferably less than 2 Debye lengths. The thinner the stationary phase relative to the Debye length the stronger and more uniform the effect of the applied charge to modulate the adsorption/desorption will be. That is, in the capacitive arrangement of FIG. 2, a greater charge level will exist along the side 54 of the stationary phase 18 that is adjacent to the insulating layer 44. The charge level decreases through the thickness of the stationary phase 18 as the distance from the insulating layer 44 increases. Thus, the weakest charge level exists at the exposed surface 52 opposite from the insulating layer 44.

As shown in FIG. 2, the stationary phase 18 may also be provided with a third electrical lead 56 connected thereto. A third charge 58 different from the first charge 36 may be supplied through the third electrical lead 56. As a result, a current passes through the stationary phase 18 between the first and third electrical leads 34, 56. Electrical properties, such as resistance, impedance and/or transconductance, may then be measured. The measured electrical property may be useful in determining various conditions of the stationary phase 18. For example, the condition of the stationary phase 18 (i.e., whether it is working properly) can be tested. In addition, the presence of absorbed components may be identified during sample testing in order to further improve chromatography performance. In some embodiments, the distance separating the first and third electrical leads 34, 56 is at least half the length of the stationary phase 18 to enable measurement of the status of the overall stationary phase throughout the column. For example, in the embodiments of FIGS. 1 and 8-9, it is preferred that one of the leads 34, 56 is near the inlet of the mixture flow, and the other lead 34, 56 is near the outlet of the mixture flow.

Figure 4:
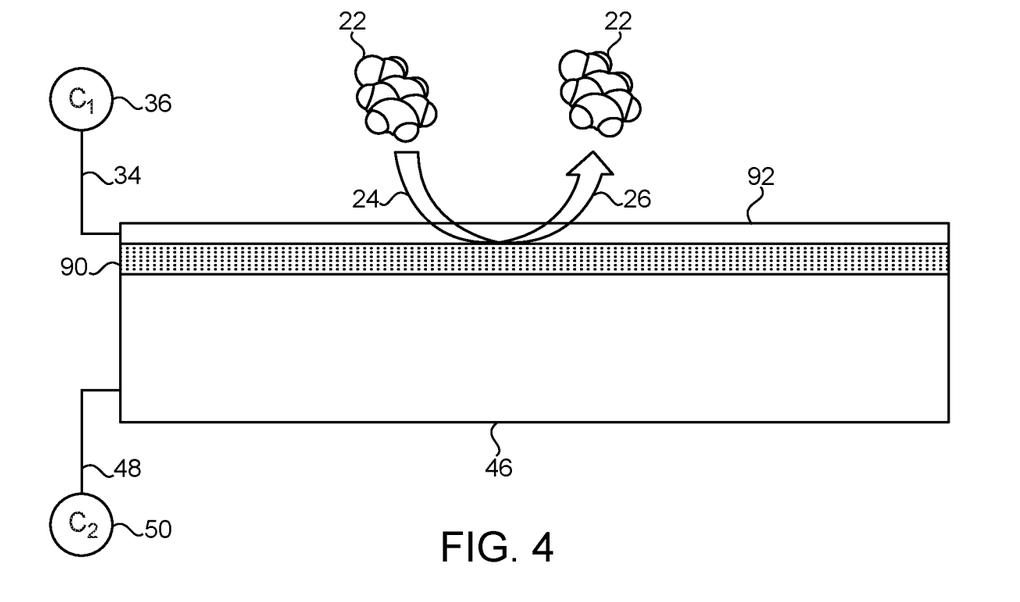
FIG. 4 is a cross-section of another stationary phase arrangement.

As shown in FIG. 4, it is also possible to place the stationary phase 90 underneath a separate conductor 92. In this arrangement, the stationary phase 90 is preferably a dielectric material. Thus, in this arrangement, the first electrical lead 34 is not connected to the stationary phase 90 like in the embodiment of FIG. 2. Instead, the first electrical lead 34 is connected to the first conductor 92 which overlies the stationary phase 90, or material phase 90. Thus, the capacitive gate arrangement in the embodiment of FIG. 4 is different than that of FIG. 2. That is, the stationary phase 90 acts as an insulating layer between the first conductor 92 and second conductor 46. Like FIG. 2, the second lead 48 is connected to the second conductor 46. By supplying a first charge 36 through the first lead 34 to the first conductor 92 and supplying a different second charge 50 through the second lead 48 to the second conductor 46, a charge differential is applied across the stationary phase 90. Like the embodiment of FIG. 2, the first and second charges 36, 50 may define a DC voltage therebetween. As described above, a sequential series of DC voltages may be used to modulate the adsorption/desorption rate of components 22 on the stationary phase 90 over time. Thus, the charge differential applied across the stationary phase 90 alters the rates of adsorption and/or desorption of the mixture components 22.

The altered rate of adsorption and/or desorption may occur due to capacitive application of pressure as a result of attractive forces between the two conductors 92, 46, piezo-electric/electrostrictive forces, ferro-electric re-poling, electrocaloric effects, etc. The stationary phase 90 is preferably a polymeric material. It is further preferable for the stationary phase 90 to be non-conducting and possess significant sorptive capacity for the relevant analyte and substantially possess one or more of the characteristics of mechanical deformability under compressive strain, piezo-electric/electrostrictive response, ferroelectric response and/or electrocaloric response. Examples of possible materials for the stationary phase 90 include dielectric elastomers such as polydimethylsiloxane, ferroelectric polymers such as poly(vinylidene fluoride) and poly(vinylidenefluoride-co-trifluoroethylene), electrostrictive polyurethane polyethers and polyesters, electrostrictive graft polymers such as poly(chlorotrifluoroethylene-vinylidene)-graft-poly(vinylidene fluoride), polyurethane-graft-poly(vinylidene fluoride), etc. Since the stationary phase 90 adsorbs and/or desorbs molecules 22 of the gas mixture, it is also preferable for the stationary phase 90 to be permeable to allow molecules 22 to penetrate into and back out of the stationary phase 90.

In order for the stationary phase 90 to be exposed to the gas mixture, it is preferable for the first conductor 92 to be permeable to allow the gas mixture to pass through the first conductor 92. This may be done by depositing particles or fibers of the first conductor 92 onto the stationary phase 90 to form an interconnected lattice defining the first conductor 92. For example, carbon nanotubes (e.g., multi-wall carbon nanotubes) or metallic nanowires may be used. It is also possible for the first conductor 92 to be a permeable conductive polymer film, such as poly(3,4-ethylenedioxythiophene) polystyrene sulfonate (PEDOT:PSS).

It is understood that the embodiments of FIGS. 2 and 4 share many of the same advantages, and advantages described herein with respect to either embodiment typically applies to both embodiments. In general, the embodiments of FIGS. 2 and 4 are considered to be alternative embodiments that may be used for the stationary phase 18, 90 arrangement in a chromatograph 10 or other similar device 68. However, it is possible that the embodiments of FIGS. 2 and 4 could be combined if desired to permit both the intermediate layer 44, 90 and the outer layer 18, 92 to adsorb and/or desorb components 22 of the gas mixture. In such an embodiment, the outer layer 18, 92 would act as both a tunable stationary phase while also allowing components 22 to pass therethrough and would also behave as one of the conductors in a capacitive arrangement. The intermediate layer 44, 90 in such an embodiment would act as both an insulator in a capacitive arrangement and as a stationary phase. However, it is believed that a combination of the two embodiments would be more difficult to tune if both layers behave as a stationary phase, and thus, it is believed that FIGS. 2 and 4 would be more preferable as alternative arrangements as compared to a combination thereof.

It is notable that the application of a charge to the stationary phase 18 or a charge differential across the stationary phase 90 has several distinct advantages over current methods of chromatography. For example, changes in the charge can be applied much more rapidly and with greater accuracy compared to thermal modulation. Thus, thermal fluctuations could be compensated for. Faster modulation of adsorption/desorption rates is also possible. It is also notable that in many cases thermal and charge modulations will have somewhat different magnitudes of impact on the adsorption/desorption dynamics of different species.

The described method may also be used in conjunction with rapid dynamic measurement methods of adsorption/desorption as described above to provide a method for chromatography where dynamic feedback is utilized to maximize the quality of data provided by the chromatographic test. This may be realized by modulating the applied chromatographic column conditions (charge, temperature, etc.) as a dynamic function of the output data of the column 16 to dynamically indicate the process of adsorption/desorption events in process. In some embodiments this may be used in an automated system to automatically use the feedback mechanism to optimize the data quality provided.

It is also possible to use data obtained on differential adsorption/desorption dynamics of species of components without incorporation into a column 16 with a terminal detector 20 as in a traditional chromatography setup. For instance, the described arrangement can be embodied as an element in a chamber similar to a pre-concentrator unit wherein the element may be exposed to a mixture at a low initial temperature and then slowly ramped in temperature with an electronic property (such as resistance) continuously monitored such that when desorption events occur they are dynamically measured. At the same time, the applied charge may be dynamically modulated to tune the desorption event to maximize the data quality obtained from this measurement.

In some embodiments, a small amplitude AC voltage may be supplied between the first and second leads 34, 48 in addition to any biasing voltage (e.g., DC voltage) to measure impedance characteristics across the junction in order to measure various conditions of the stationary phase 18, 90. The measured electrical property may be useful in determining various conditions of the stationary phase 18, 90. For example, the condition of the stationary phase 18, 90 (i.e., whether it is working properly) can be tested. In addition, the presence of absorbed components 22 may be identified during sample testing in order to further improve chromatography performance. Measurement of the presence of adsorbed components 22 enables a dynamic measurement of adsorption/desorption events in-situ within the stationary phase 18, 90. This measurement may be conducted at a single frequency and amplitude or over some multiplicity thereof.

Although the following embodiments are described in the context of the embodiment FIG. 2, is understood that the embodiment of FIG. 4 could also be implemented as detailed in FIGS. 5-10 by substituting the intermediate layer stationary phase 90 of FIG. 4 for the insulating layer 44 of FIG. 2 and substituting the first conductor 92 of FIG. 4 for the outer layer stationary phase 18 of FIG. 2.

Figure 5:
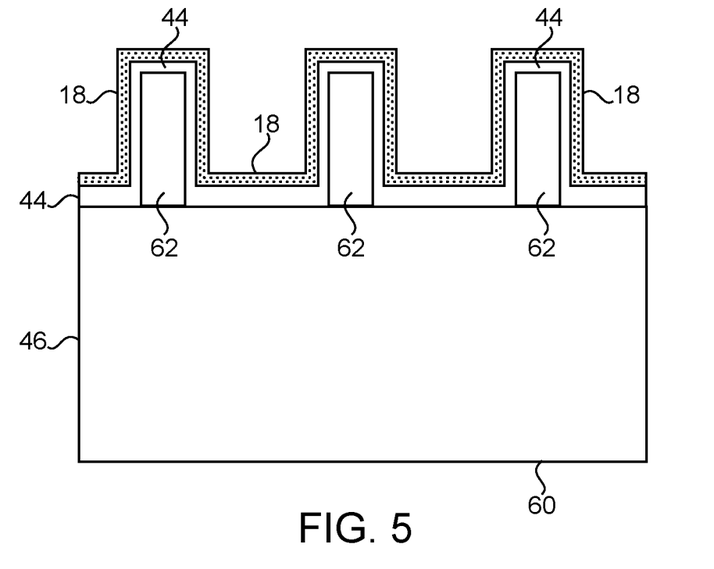
FIG. 5 is a cross-section of another embodiment of the stationary phase.

One embodiment of the capacitive gate arrangement is shown in FIG. 5. In this embodiment, the conductor 46 is made up of at least two parts. The first part 60 of the conductor 46 is a substrate 60 made of one material with a smooth surface. The second part 62 is located on the smooth surface and is preferably made of a different material than the substrate 60. The second part 62 of the conductor 46 creates a three-dimensional surface with a greater surface area than the smooth surface area of the substrate 60. In one embodiment, it may be desirable for the substrate 60 to be silicon and the second part 62 to be a vertically aligned copper nanowire array 62. The insulating layer 44 may be located over the two-part conductor 46 so that the insulating layer 44 conforms to the three-dimensional surface of the conductor 46. The stationary phase 18 may then be located over the insulating layer 44 and also conforms to the three-dimensional surface of the conductor 46. As a result, greater surface area of the stationary phase 18 is possible for absorbing/desorbing mixture components, while ensuring sufficient capacitive charge in the stationary phase 18 for modulation of adsorption/desorption rates.

Figure 6:
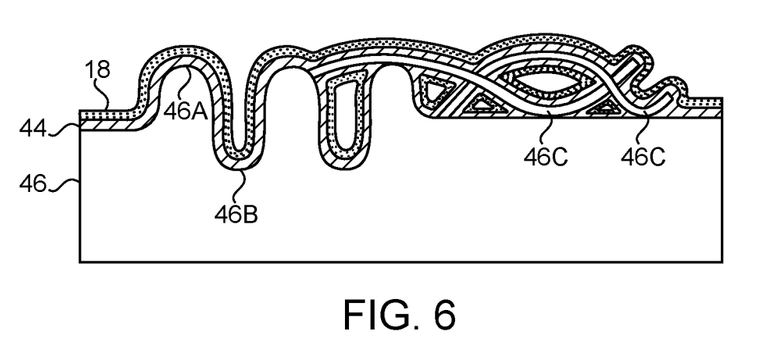
FIG. 6 is a cross-section of another embodiment of the stationary phase.

Another embodiment of the capacitive gate arrangement is shown in FIG. 6. In this embodiment, the conductor substrate 46 is a surface possessing features that create substantial surface roughness to increase the surface area of the substrate 46. For example, the substrate 46 may include protrusions 46A, recesses 46B, and deposited materials 46C thereon. In one embodiment, silicon which has been lithographically patterned or electrochemically roughened may be used. A metallic substrate may also be etched to increase surface area. Materials, such as fibers, tubes or particles, may also be deposited on the substrate to form the roughened surface. If the substrate and/or deposited materials are not sufficiently conductive, a thin layer of metal or other conductive material may be conformally coated thereon. Preferably, the structure of the roughened features is chosen to facilitate the flow of gas into and out of the surface area created by these features. As shown in FIG. 6, the insulating layer 44 may be conformally coated over the roughened substrate 46. The stationary phase 18 may then be conformally coated over the insulating layer 44 to form a three-dimensional surface.

Figure 7:
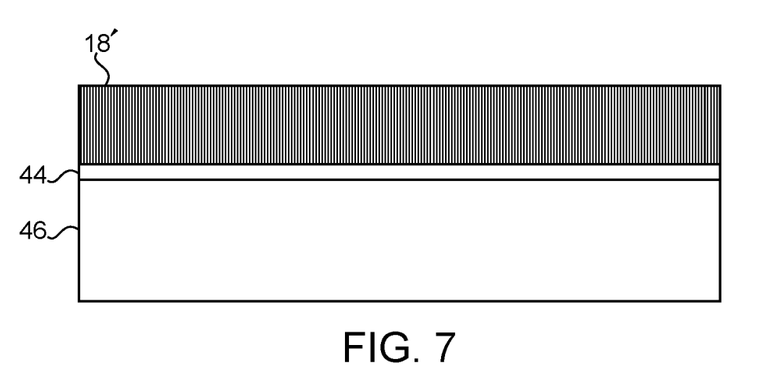
FIG. 7 is a cross-section of another embodiment of the stationary phase.

Another embodiment of the capacitive gate arrangement is shown in FIG. 7. In this embodiment, the conductor substrate 46 is a smooth surface, and the insulating layer 44 is located on the smooth surface of the substrate 46. The stationary phase 18' may then be a vertically aligned carbon nanotube array 18' located on the insulating layer 44. The advantage of this embodiment is that the thickness of the stationary phase 18' may be thicker (e.g., up to 10 µm) since the capacitive charge extends further from the insulating layer 44 with a vertically aligned carbon nanotube array 18'.

Figure 8:
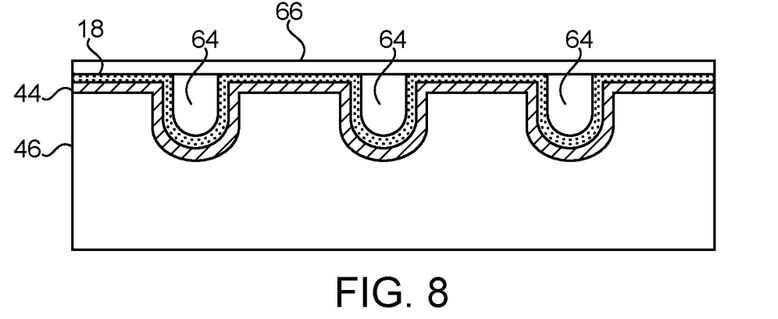
FIG. 8 is a cross-section of a substrate with the stationary phase deposited thereon.
Figure 9:
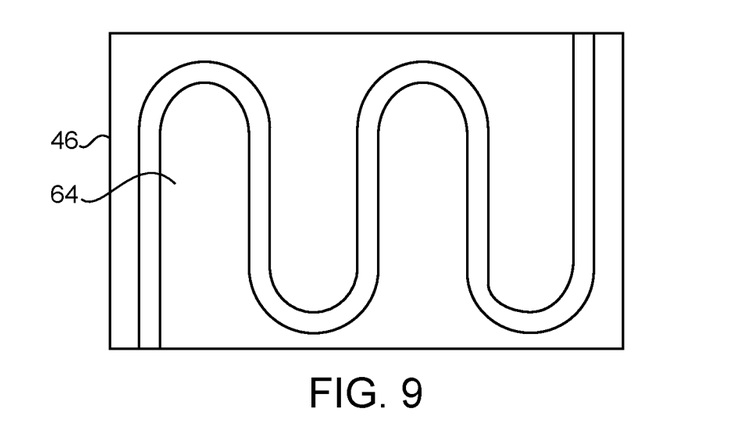
FIG. 9 is a top view of the embodiment of FIG. 7, showing the path of the channel.

Although the inventions herein may be embodied in an extruded tube column 16 like in conventional chromatographs if desired, it may be advantageous to use silicon chip manufacturing techniques to make the structure. For example, as shown in FIGS. 8-9, the conductor 46 may be a silicon substrate 46. Preferably, a channel 64 is etched into the silicon substrate 46 in a circuitous path. The insulating layer 44 and the stationary phase 18 may then be deposited onto the substrate 46 so that the channel 64 remains open to allow the mixture to flow through the channel 64. A cover 66 may be placed over the substrate 46 to enclose the channel 64. This design may make the chromatograph 10 smaller and cheaper to make and may lend itself to providing electrical leads 34, 48, 56 as described above and simplifying the fabrication conditions for the stationary phase with controlled geometry. While the embodiments of FIGS. 5-7 did not illustrate channels or a cover, it is understood that any of the embodiments described herein could be made according to the techniques of FIGS. 8-9.

Conformable layers as described herein may be applied using any method known to those of skill in the art. However, it may be preferred to use iCVD to apply the intermediate layer 44, 90 due to the non-conductive characteristic of the intermediate layer 44, 90. It may also be preferred to use oCVD to apply the outer layer 18, 92 due to the conductive (or semi-conductive) characteristic of the outer layer 18, 92.

Although the preferred embodiment of the stationary phase described herein is used in chromatography, it should be understood that the stationary phase and arrangements described herein could be used in other devices as well. That is, the described inventions involve architectures and methods for molecular separation processes, including a molecular separation process that simultaneously senses the adsorption and desorption of molecular species. Thus, the methods and structures described herein could also be used in other molecular separation devices besides chromatography.

Figure 10:
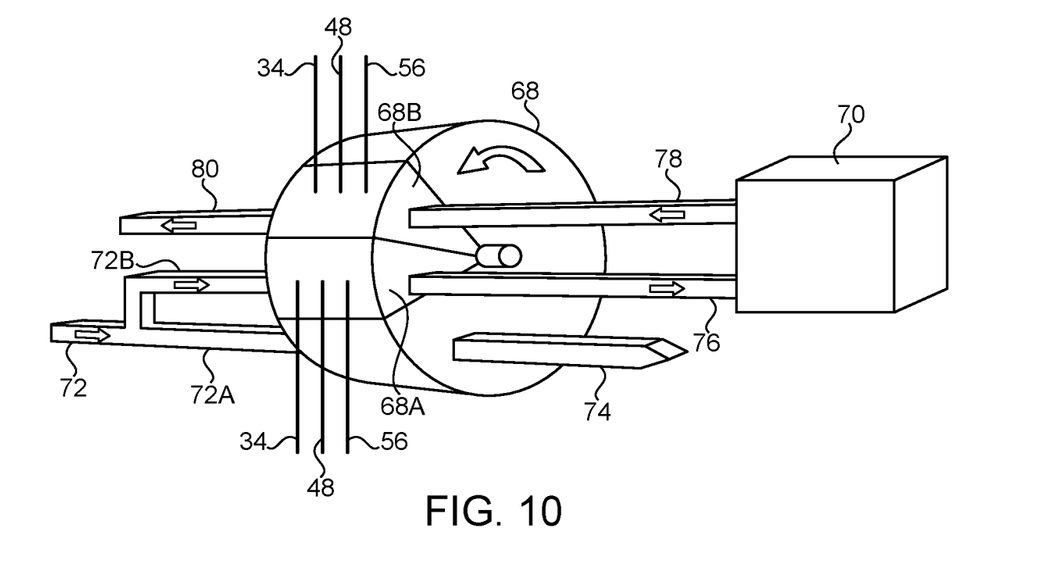
FIG. 10 is a schematic view of a molecular separation device.

In some embodiments, the inventions may be constructed in the form of a sorptive stationary phase as described above which is operated by cyclically contacting the sorptive phase with a gaseous environment to preferentially adsorb a particular set of molecular components under one set of conditions and then subsequently desorb them under another set of conditions to create one or more output streams which possess a purified composition of components compared to the original input stream. It is understood herein that the terms stationary phase and sorptive phase are interchangeable with each other. One such arrangement is shown in FIG. 10. In this embodiment, the stationary phase is arranged in the form of a segmented cylindrical rotor 68 as is typical of a volatile organic compound (VOC) concentrator rotor. Each of the segments 68A, 68B are provided with one or more leads 34, 48, 56 as described above for individually modulating and/or detecting the sorptive phase, or material phase, in each segment 68A, 68B. If an auxiliary heater 70 is used, the input stream 72 may be split into first and second input streams 72A, 72B. The first input stream 72A passes through one or more segments of the rotor 68 where the components in the mixture are adsorbed by the sorptive phase of the segments. The first input stream 72A then exits the rotor 68 as a purified output stream 74 without the adsorbed components. In an auxiliary heating system, a second stream 72B also passes through a segment 68A of the rotor 68 where components are adsorbed by the sorptive phase. The second stream 72B is then supplied as an input stream 76 to the heater 70. The heater 70 heats the stream and provides a heated stream 78 to another segment 68B of the rotor 68 where the adsorbed components are desorbed. As a result, a condensed stream 80 of the components is output from the rotor 68. Although the embodiment of FIG. 10 is shown with a heater 70 in conjunction with the described leads 34, 48, 56. It is understood that cycling of the sorptive phase between periods of increased adsorption and increased desorption could be accomplished solely by supplying electrical charges to the respective leads 34, 48, 56 as described above if desired. Thus, where a typical VOC concentrator rotor works primarily based upon temperature cycling between the adsorption and desorption states, the architecture described herein allows two distinct states using suitable charges to enhance the adsorption and desorption of species. As noted, this may be carried out as the sole cycling condition or in conjunction with a temperature differential at the same time. This provides advantages over current devices including improved power efficiency for the adsorption/desorption cycle and also more rapid switching between the adsorption/desorption stages. Another such arrangement that could be used is a pressure swing adsorption purification system wherein the stationary phase described herein takes the place of or supplements a typical stationary phase used in such a device and the charge applied to the stationary phase is cycled over time and is synchronized with the pressure cycling process to enhance the concentration process.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A chromatograph or molecular separation device, comprising:
   a first conductor with a first electrical lead connected thereto, the first conductor being permeable to permit a mixture to pass therethrough;
   a second conductor with a second electrical lead connected thereto; and
   a material phase disposed between the first and second conductors, the material phase being configured to be exposed to the mixture passing through the first conductor, the mixture comprising a plurality of components having different rates of adsorption and/or desorption with the material phase;
   wherein a first electrical charge is supplied to the first conductor with the first electrical lead and a second electrical charge is supplied to the second conductor with the second electrical lead, a charge differential thereby being applied across the material phase, the charge differential altering the rates of adsorption and/or desorption of the components of the mixture with the material phase.

2. The chromatograph or molecular separation device according to claim 1, wherein the material phase comprises a dielectric material.

3. The chromatograph or molecular separation device according to claim 1, wherein the material of the material phase comprises a polymeric material.

4. The chromatograph or molecular separation device according to claim 3, wherein the polymeric material undergoes deformation in response to applied electrical forces such that the sorption energy is substantially altered for molecules sorbed within the polymer.

5. The chromatograph or molecular separation device according to claim 3, wherein the polymeric material comprises dielectric elastomers, ferroelectric polymers, electrostrictive polyurethane polyethers and polyesters, and/or electrostrictive graft polymers.

6. The chromatograph or molecular separation device according to claim 1, wherein the first conductor comprises a lattice of conductive particles or fibers.

7. The chromatograph or molecular separation device according to claim 1, wherein the first conductor comprises a conductive polymer.

8. The chromatograph or molecular separation device according to claim 7, wherein the conductive polymer is permeable.

9. The chromatograph or molecular separation device according to claim 1, wherein the first and second electrical charges define a DC voltage therebetween.

10. The chromatograph or molecular separation device according to claim 1, wherein the first and second electrical charges define a voltage therebetween, a capacitive charge thereby being applied to the material phase, and an electrical property being measured therefrom to detect a status of the material phase.

11. The chromatograph or molecular separation device according to claim 1, further comprising a silicon substrate with one or more layers or patterns deposited thereon, wherein the second conductor comprises the silicon substrate or one of the one or more layers, and the material phase and the first conductor each comprise one of the one or more layers.

12. The chromatograph or molecular separation device according to claim 11, further comprising a channel etched into the silicon substrate and/or the one or more layers deposited thereon, the material phase and the first conductor each being deposited in the channel, and the channel being configured to flow the mixture therethrough.

13. The chromatograph or molecular separation device according to claim 1, wherein the second conductor comprises a substrate of a first material with a smooth surface and a second different material disposed on the smooth surface defining a greater surface area than the smooth surface of the substrate, the material phase being conformally disposed over the smooth surface and the second different material, and the first conductor being conformally disposed over the material phase, the material phase and the first conductor thereby defining a greater surface area than the smooth surface of the substrate.

14. The chromatograph or molecular separation device according to claim 1, wherein the second conductor comprises a substrate with a roughened surface comprising protrusions or recesses formed thereon, the material phase being conformally disposed over the roughened surface, and the first conductor being conformally disposed over the material phase, the material phase and the first conductor thereby defining a three-dimensional surface.

15. The chromatograph or molecular separation device according to claim 1, wherein the second conductor comprises a substrate with a smooth surface, the material phase being disposed over the smooth surface of the substrate, and the second conductor being disposed over the material phase.

16. The chromatograph or molecular separation device according to claim 1, wherein at least one of the first and second electrical charges is cyclically varied to create increased adsorption during one period of a cycle and increased desorption during another period of the cycle.

17. The chromatograph or molecular separation device according to claim 1, wherein the material phase comprises a dielectric material, the dielectric material comprising a polymeric material.

18. The chromatograph or molecular separation device according to claim 17, wherein the polymeric material undergoes deformation in response to applied electrical forces such that the sorption energy is substantially altered for molecules sorbed within the polymer, and the first conductor comprises a lattice of conductive particles or fibers or a permeable conductive polymer.

19. The chromatograph or molecular separation device according to claim 18, wherein the first and second electrical charges define a DC voltage therebetween.

20. The chromatograph or molecular separation device according to claim 19, further comprising a silicon substrate with one or more layers or patterns deposited thereon, wherein the second conductor comprises the silicon substrate or one of the one or more layers, and the material phase and the first conductor each comprise one of the one or more layers, and further comprising a channel etched into the silicon substrate and/or the one or more layers deposited thereon, the material phase and the first conductor each being deposited in the channel, and the channel being configured to flow the mixture therethrough.

* * * * *